United States Patent
Suyama (10) Patent No.: US 11,363,217 B2
(45) Date of Patent: Jun. 14, 2022

(54) SUBTITLE GENERATION APPARATUS, SUBTITLE GENERATION METHOD, AND NON-TRANSITORY STORAGE MEDIUM

(71) Applicant: JVCKENWOOD Corporation, Yokohama (JP)

(72) Inventor: Akinori Suyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 105 days.

(21) Appl. No.: 17/016,450

(22) Filed: Sep. 10, 2020

(65) Prior Publication Data

US 2020/0412979 A1 Dec. 31, 2020

Related U.S. Application Data

(63) Continuation of application No. PCT/JP2019/009509, filed on Mar. 8, 2019.

(30) Foreign Application Priority Data

Mar. 12, 2018 (JP) .............................. JP2018-044168

(51) Int. Cl.
*H04N 5/278* (2006.01)
*G06F 40/40* (2020.01)
*G06V 20/40* (2022.01)

(52) U.S. Cl.
CPC ............. *H04N 5/278* (2013.01); *G06F 40/40* (2020.01); *G06V 20/46* (2022.01)

(58) Field of Classification Search
CPC .... H04N 21/4884; H04N 5/445; H04N 5/278; H04N 5/265; H04N 21/4888; G06F 40/40; G06V 20/46

(Continued)

(56) References Cited

U.S. PATENT DOCUMENTS

2003/0065503 A1* 4/2003 Agnihotri .......... H04N 21/4307
704/7

FOREIGN PATENT DOCUMENTS

| JP | 2000-244831 | 9/2000 |
| JP | 2002-335490 | 11/2002 |
| JP | 2009-177502 | 8/2009 |

OTHER PUBLICATIONS

International Search Report and Written Opinion for International Application No. PCT/JP2019/009509 dated May 7, 2019, 9 pages.

* cited by examiner

*Primary Examiner* — Sherrie Hsia
(74) *Attorney, Agent, or Firm* — Amin, Turocy & Watson, LLP (57) ABSTRACT

An apparatus includes a text information extraction unit that extracts character information from a video including characters, a text coincidence detection unit that detects character information included in dialogue information that is data of a dialogue associated with the video data from the extracted character information, a text translation unit that translates the character information, a display position calculation unit that calculates a display position of translated text information in the video data on the basis of a text region information that indicates a region in which a video corresponding to the character information is displayed in the video data and on the basis of the translated text information, and a subtitle synthesizing unit that adds, as a subtitle, the translated text information on the basis of display position information.

4 Claims, 10 Drawing Sheets

(58) Field of Classification Search
USPC ............... 348/563, 564, 468, 589, 598, 600
See application file for complete search history.

| KEYWORD | TRANSLATED TEXT |
|---|---|
| ABC Corporation | KABUSHIKI KAISYA ABC |
| 1-2,△△-cho | 1-2, ○○CHO |
| ⋮ | ⋮ |

SUBTITLE GENERATION APPARATUS, SUBTITLE GENERATION METHOD, AND NON-TRANSITORY STORAGE MEDIUM

CROSS-REFERENCE TO RELATED APPLICATION

This application is a Continuation of PCT International Application No. PCT/JP2019/009509 filed on Mar. 8, 2019 which claims the benefit of priority from Japanese Patent Application No. 2018-044168 filed on Mar. 12, 2018, the entire contents of both of which are incorporated herein by reference.

BACKGROUND

1. Technical Field

The present disclosure relates to a subtitle generation apparatus, a subtitle generation method, and a non-transitory storage medium.

2. Description of the Related Art

A video including dialogues in a foreign language is displayed such that translated subtitles of the dialogues are displayed together with the video. A technology that makes it possible to switch between display and non-display of the translated subtitles and a technology that makes it possible to change display positions of the translated subtitles have been known (for example, see Japanese Laid-open Patent Publication No. 2000-244831, Japanese Laid-open Patent Publication No. 2002-335490, and Japanese Laid-open Patent Publication No. 2009-177502).

In the video, characters, such as foreign languages, may appear in addition to specific persons and landscapes (hereinafter, a video including characters is referred to as a text video). It is desirable to translate the text video in a foreign language in a certain video if needed. However, if translated subtitles of the text video are generated manually, it takes time and effort. As described above, there is a room for improvement in work efficiency of operation for generating translated subtitles of the text video.

SUMMARY

It is an object of the present disclosure to at least partially solve the problems in the conventional technology.

To solve the above problems and achieve the above object, a subtitle generation apparatus according to the present disclosure includes a text information extraction unit configured to extract character information from video data of a video that includes characters, a text coincidence detection unit configured to detect character information included in dialogue information that is data of a dialogue associated with the video data, from the character information extracted by the text information extraction unit, a text translation unit configured to generate translated text information that is a translation of the character information detected by the text coincidence detection unit, a display position calculation unit configured to calculate a display position of the translated text information in the video data, on the basis of text region information that indicates a region in which a video corresponding to the character information is displayed in the video data and on the basis of the translated text information, and a subtitle synthesizing unit configured to add, as a subtitle, the translated text information to the video data on the basis of display position information calculated by the display position calculation unit.

A subtitle generation apparatus according to the present disclosure includes a video data the storage unit configured to store therein video data of a video including characters, a dialogue information storage unit configured to store therein dialogue information that is data of a dialogue associated with the video data, a text information storage unit configured to store therein character information extracted from the video and appearance time information indicating a time at which the character information extracted from the video appears, a coincident time storage unit configured to store therein coincident time information indicating a time at which the character information stored in the text information storage unit appears in the dialogue information stored in the dialogue information storage unit, a timeline video generation unit configured to generate a timeline video in which the appearance time information on the character information stored in the text information storage unit and the coincident time information stored in the coincident time storage unit are displayed on an entire timeline of the video data, and a video synthesizing unit configured to synthesize the timeline video generated by the timeline video generation unit in the video data.

A subtitle generation method according to the present disclosure includes extracting character information from video data of a video that includes characters, detecting character information included in dialogue information that is data of a dialogue associated with the video data, from the character information extracted at the extracting, generating translated text information that is a translation of the character information detected at the detecting, calculating a display position of the translated text information in the vide data, on the basis of text region information that indicates a region in which a video corresponding to the character information is displayed in the video data and on the basis of the translated text information, and adding, as a subtitle, the translated text information to the video data on the basis of display position information calculated at the calculating.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Embodiments of a subtitle generation apparatus, a subtitle generation method, and a non-transitory storage medium according to the present disclosure will be described in detail below with reference to the accompanying drawings. The present disclosure is not limited by the embodiments below.

First Embodiment

Figure 1:
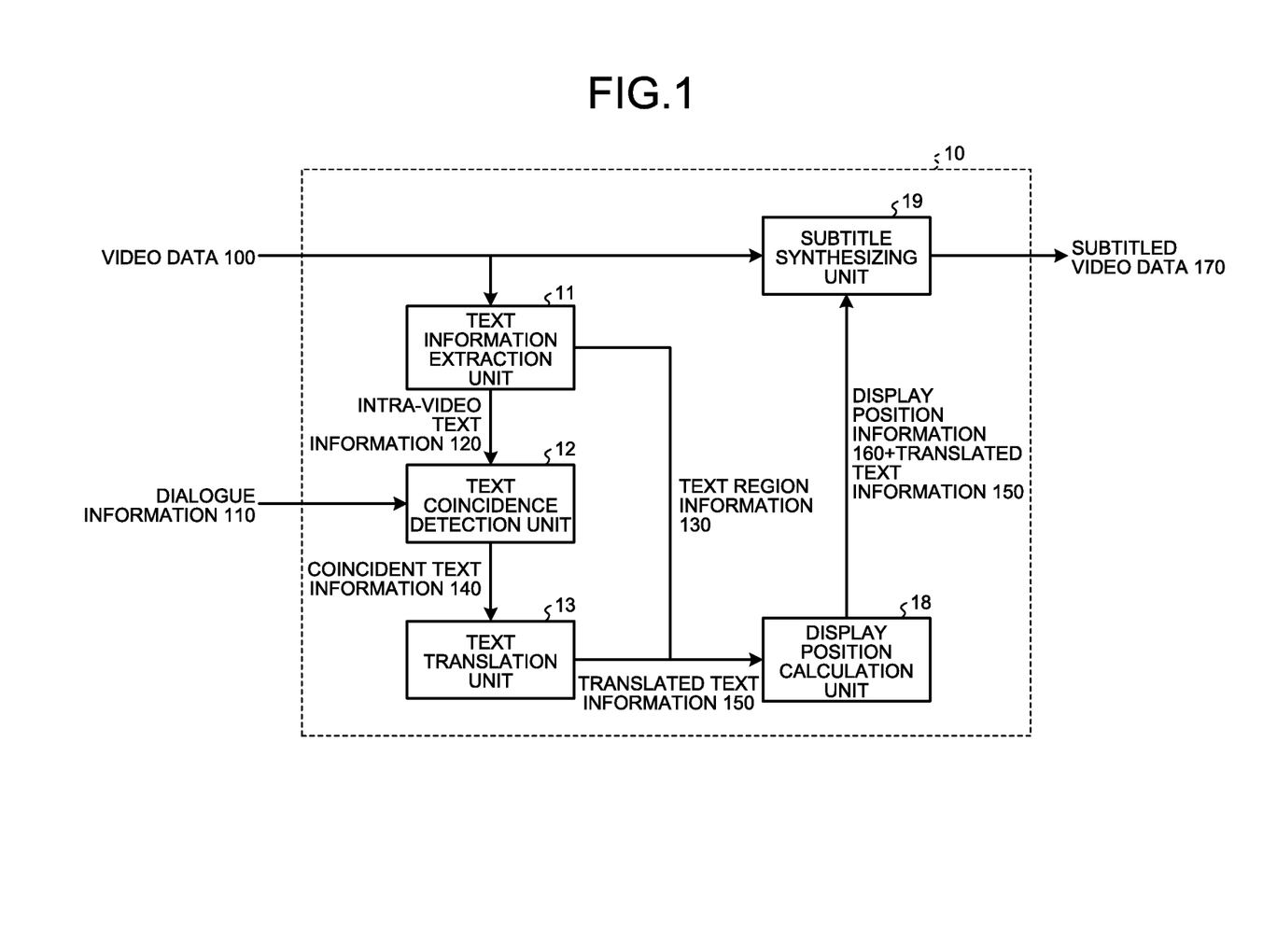
FIG. 1 is a block diagram illustrating a configuration example of a subtitle generation apparatus according to a first embodiment.

FIG. 1 is a block diagram illustrating a configuration example of a subtitle generation apparatus according to a first embodiment. A subtitle generation apparatus 10 generates a translated subtitle (hereinafter, simply referred to as a "subtitle") that is a translation of video data 100 of a video including a text video in a first language, such as a foreign language, into a second language that is different from the first language. For example, in Japan, the subtitle generation apparatus 10 generates a subtitle that is a Japanese translation of the video data 100 of a video including an English text video.

Further, it is preferable for the subtitle generation apparatus 10 to generate a translated subtitle of only a text video that is needed for a story or a text video that is important. In the present embodiment, explanation will be given based on the assumption that the first language is a foreign language.

Figure 2:
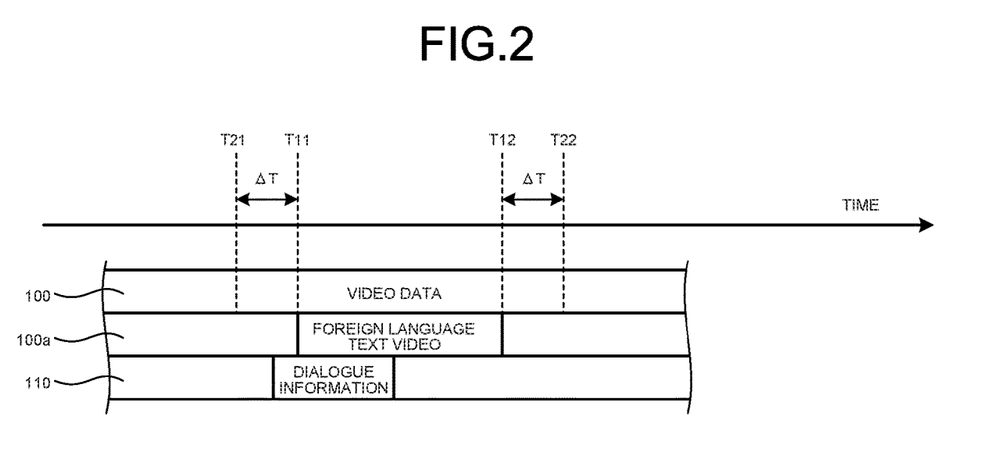
FIG. 2 is a diagram illustrating an example of video data.

With reference to FIG. 2, the video data 100 will be described. FIG. 2 is a diagram illustrating an example of the video data according to the first embodiment. The video data 100 is data of a video that includes a foreign language text video 100*a*. The video data 100 is a moving image that is constructed of a several tens of frames per second, for example. The video data 100 includes the foreign language text video 100*a* and dialogue information 110 that is data of a dialogue in the foreign language. The video data 100 may include translated dialogue information that is a translation from the foreign language.

The foreign language text video 100*a* is, for example, a video of sentences that are written on a paper, a video of characters that are written on a sign on a building, a video of characters that are written on a room name plate, or the like.

The dialogue information 110 is data of a dialogue in the foreign language that is not yet translated and that corresponds to the video. The dialogue information 110 includes text of the dialogue that is not yet translated and dialogue timing information including a timing at which voice of the dialogue starts and a timing at which the voice of the dialogue ends in accordance with the video data 100. In the present embodiment, the dialogue timing information is a start time based on the assumption that a start time of the video data 100 is set to zero, and an end time at which the voice ends. Alternatively, the dialogue timing information may be defined by the number of frames based on the assumption that the top frame of the video data 100 is the first frame, or may be defined by stamp position information provided in the video data 100.

The dialogue information 110 may be generated by a voice recognition process on voice data of a dialogue that is included in the video data 100. Alternatively, the dialogue information 110 may be generated from text data of a dialogue in a scenario or a script.

The subtitle generation apparatus 10 is an arithmetic processing device (control unit) that is configured with, for example, a central processing unit (CPU) or a processor for video processing. The subtitle generation apparatus 10 loads a program that is stored in a storage unit (not illustrated) from a memory, and executes commands included in the program. The subtitle generation apparatus 10 includes one or more devices. The subtitle generation apparatus 10 includes a text information extraction unit 11, a text coincidence detection unit 12, a text translation unit 13, a display position calculation unit 18, and a subtitle synthesizing unit 19.

The text information extraction unit 11 extracts intra-video text information 120 from the video data 100 of the video including the foreign language text video 100*a*. More specifically, the text information extraction unit 11 acquires the video data 100. Then, the text information extraction unit 11 performs a character recognition process, such as an optical character reader (OCR) process, on the acquired video data 100, and extracts character information that is a digital character code available to a computer or the like. The character information is extracted because the foreign language text video 100*a* includes the foreign language. Meanwhile, the character information is referred to as the intra-video text information 120. The text information extraction unit 11 outputs the extracted intra-video text information 120 to the text coincidence detection unit 12 and the display position calculation unit 18.

The text information extraction unit 11 extracts the intra-video text information 120 from a text video in the same language as the language of the dialogue information 110. In other words, the text information extraction unit 11 extracts the intra-video text information 120 from the text video in the language that is not yet translated.

The text information extraction unit 11 may extract the intra-video text information 120 for only the foreign language text video 100*a* that is displayed in close-up. More specifically, the text information extraction unit 11 may extract the intra-video text information 120 if a ratio of a display region of the foreign language text video 100*a* to an entire display region of the video is equal to or larger than a threshold.

The text information extraction unit 11 may perform an image recognition process on the video data 100, extract, for example, a video of sentences that are written on a paper, a video of characters that are written on a sign on a building, and a video of characters that are written on a room name plate, and extract text included in the extracted videos as the intra-video text information 120.

Further, when extracting the intra-video text information 120, the text information extraction unit 11 acquires text region information 130 that indicates a region in which the intra-video text information 120 is displayed as a video in the video data 100. Meanwhile, the text region information 130 is information that indicates a range including the characters displayed on the text video 100a as a range in a horizontal direction and a vertical direction in the video data 100, for example. The text information extraction unit 11 outputs the text region information 130 to the display position calculation unit 18.

Furthermore, when extracting the intra-video text information 120, the text information extraction unit 11 acquires appearance time information on a time at which the foreign language text video 100a appears in the video data 100. In the present embodiment, the appearance time is a display time that is defined by an appearance time T11 based on the assumption that the start time of the video data 100 is set to zero and a disappearance time T12 at which the display is finished. Alternatively, the appearance time information may be defined by the number of frames based on the assumption that the top frame of the video data 100 is the first frame, or may be defined by stamp position information provided in the video data 100.

The text coincidence detection unit 12 detects, as coincident text, character information that is included in the dialogue information 110 associated with the video data 100 from the intra-video text information 120 that is the character information extracted by the text information extraction unit 11. More specifically, the text coincidence detection unit 12 acquires, from the extracted intra-video text information 120, text (character information) that is included in the dialogue information 110 in the video data 100 within a predetermined range with reference to the appearance time at which characters included in the video appear. For example, the text coincidence detection unit 12 acquires the dialogue information 110 from a time T21, which is a certain amount of time ΔT before the appearance time T11, to a time T22, which is the certain amount of time ΔT after the disappearance time T12. The certain amount of time ΔT is, for example, 5 seconds. Then, the text coincidence detection unit 12 searches for coincident text that coincides with the extracted intra-video text information 120, in the acquired dialogue information 110. Then, if the coincident text is present, in other words, if the intra-video text information 120 is text (character information) that is included in the dialogue information 110 on the basis of a search result, the text coincidence detection unit 12 adopts the intra-video text information 120 as a translation target. If the coincident text is not present, in other words, if the intra-video text information 120 is text that is not included in the dialogue information 110 on the basis of the search result, the text coincidence detection unit 12 does not adopt the extracted intra-video text information 120 as a translation target. If the coincident text is present, the text coincidence detection unit 12 outputs coincident text information 140 to the text translation unit 13.

In this manner, if the dialogue information 110 at a time including times before and after a display time of the intra-video text information 120 coincides with the intra-video text information 120 on a sentence that is written on a paper, the text coincidence detection unit 12 detects coincident text as the coincident text information 140. For example, if the dialogue information 110 indicating that a person reads a sentence written on a paper coincides with the intra-video text information 120 on a sentence written on a paper at a certain time in a predetermined range, the text coincidence detection unit 12 extracts the text as the coincident text information 140.

The text translation unit 13 generates translated text information 150 that is a translation of the coincident text that is the character information detected by the text coincidence detection unit 12. The text translation unit 13 translates the coincident text by using a known translation method. The translation method is not specifically limited, and any known translation method may be adopted. The text translation unit 13 outputs, as the translated text information 150, translated text that has been translated to the display position calculation unit 18. Meanwhile, the translated text information 150 is information in which character information as a digital character code available to a computer or the like is translated into character information in a different language.

The display position calculation unit 18 calculates a display position of the translated text information 150 in the video data 100 from the text region information 130 and the translated text information 150 that has been translated by the text translation unit 13. More specifically, the display position calculation unit 18 calculates, as the display position of the translated text information 150, a display position that does not overlap with the text region information 130 in the video data 100 from the text region information 130 and the translated text information 150. The display position calculation unit 18 outputs calculated display position information 160 together with the translated text information 150 to the subtitle synthesizing unit 19.

In the present embodiment, a font, a font size, a color, and the maximum number of characters per line for displaying the translated text information 150 as a subtitle are set in advance. Therefore, as for the translated text information 150, the number of lines of translated text and the number of characters per line are calculated on the basis of the number of characters of the translated text, and a display space that is a size of a region needed to display the translated text in the video data 100 is determined.

Further, a display time of the appearance time information is a display time at which the translated text information 150 is displayed as a subtitle.

Figure 3:
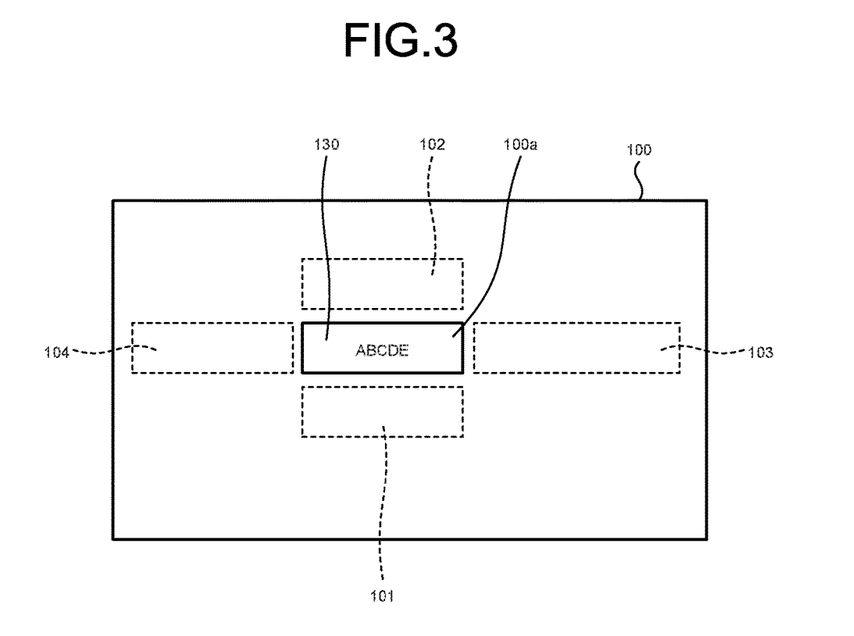
FIG. 3 is a diagram for explaining an example of the video data and a display position of translated text information.

With reference to FIG. 3, the display position will be described. FIG. 3 is a diagram for explaining an example of the video data and the display position of the translated text information. If a display space for the translated text information 150 is present in a lower portion 101 of the text region information 130 in the video data 100, the display position calculation unit 18 adopts the lower portion 101 of the text region information 130 as the display position. Alternatively, if the display space for the translated text information 150 is present in an upper portion 102 of the text region information 130 in the video data 100, the display position calculation unit 18 adopts the upper portion 102 of the text region information 130 as the display position. Still alternatively, if the display space for the translated text information 150 is present in a right portion 103 of the text region information 130 in the video data 100, the display position calculation unit 18 adopts the right portion 103 of the text region information 130 as the display position. Still alternatively, if the display space for the translated text information 150 is present in a left portion 104 of the text region information 130, the display position calculation unit 18 adopts the left portion 104 of the text region information 130 as the display position.

Figure 4:
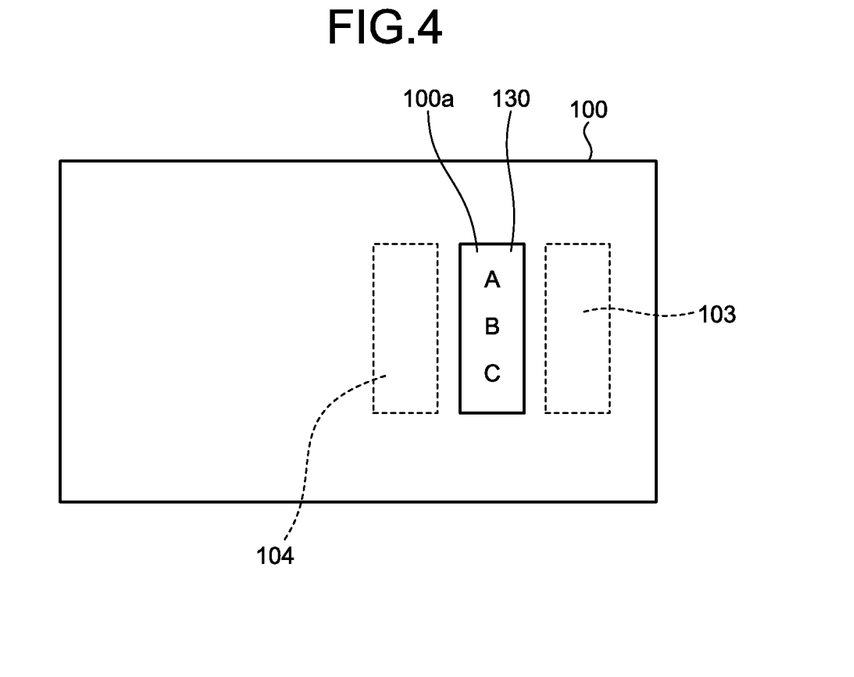
FIG. 4 is a diagram for explaining another example of the video data and the display position of the translated text information.

With reference to FIG. 4, another example of the display position will be described. FIG. 4 is a diagram for explaining another example of the video data and the display position of the translated text information. The display position calculation unit 18 may calculate the display position in accordance with a writing direction in which the characters of the intra-video text information 120 displayed on the text region information 130 are arranged. For example, if the writing direction of the intra-video text information 120 is the vertical direction, in other words, in a case of vertical writing, the display position calculation unit 18 determines whether a display space for displaying the translated text information 150 in the vertical direction is present. In the example illustrated in FIG. 4, display spaces are present in the right portion 103 and the left portion 104 of the text region information 130, but no display space is present in the upper portion and the lower portion. In this case, the display position calculation unit 18 adopts the right portion 103 or the left portion 104 of the text region information 130 as the display position for displaying the translated text information 150 in the vertical direction similarly to the intra-video text information 120.

Figure 5:
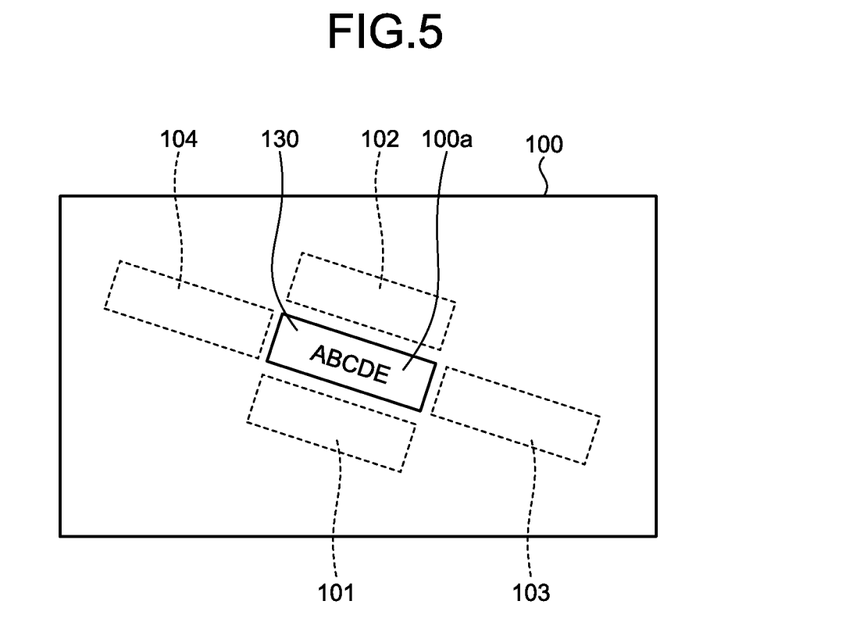
FIG. 5 is a diagram for explaining still another example of the video data and the display position of the translated text information.

With reference to FIG. 5, still another example of the display position will be described. FIG. 5 is a diagram for explaining still another example of the video data and the display position of the translated text information. If the text region information 130 is inclined, the display position calculation unit 18 may calculate a display position that is inclined in accordance with inclination of the text region information 130. For example, if the intra-video text information 120 is inclined diagonally downward to the right, the display position calculation unit 18 determines whether a display space for displaying the translated text information 150 diagonally downward to the right is present. In the example illustrated in FIG. 5, display spaces are present in the upper portion 102, the lower portion 101, the right portion 103, and the left portion 104 of the text region information 130. In this case, the display position calculation unit 18 adopts the display position for displaying the translated text information 150 in an inclined manner similarly to the intra-video text information 120.

The subtitle synthesizing unit 19 generates subtitled video data 170 in which the translated text information 150 is added as a subtitle to the foreign language text video 100a of the video data 100, on the basis of the display position information 160 calculated by the display position calculation unit 18. More specifically, the subtitle of the foreign language text video 100a is defined by the translated text information 150, the display position information 160, and a display time. Further, the subtitle of the foreign language text video 100a may be defined with inclusion of at least any of a font, a font size, and a color, for example. The subtitle of the foreign language text video 100a is characters that are defined as above and that are recognizable to a human being.

Figure 6:
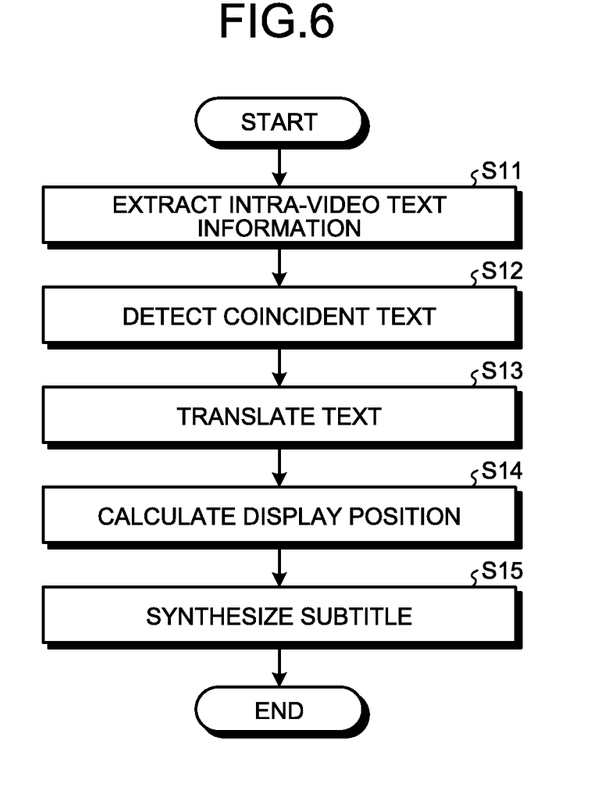
FIG. 6 is a flowchart illustrating an example of a process performed by the subtitle generation apparatus according to the first embodiment.
Figure 7:
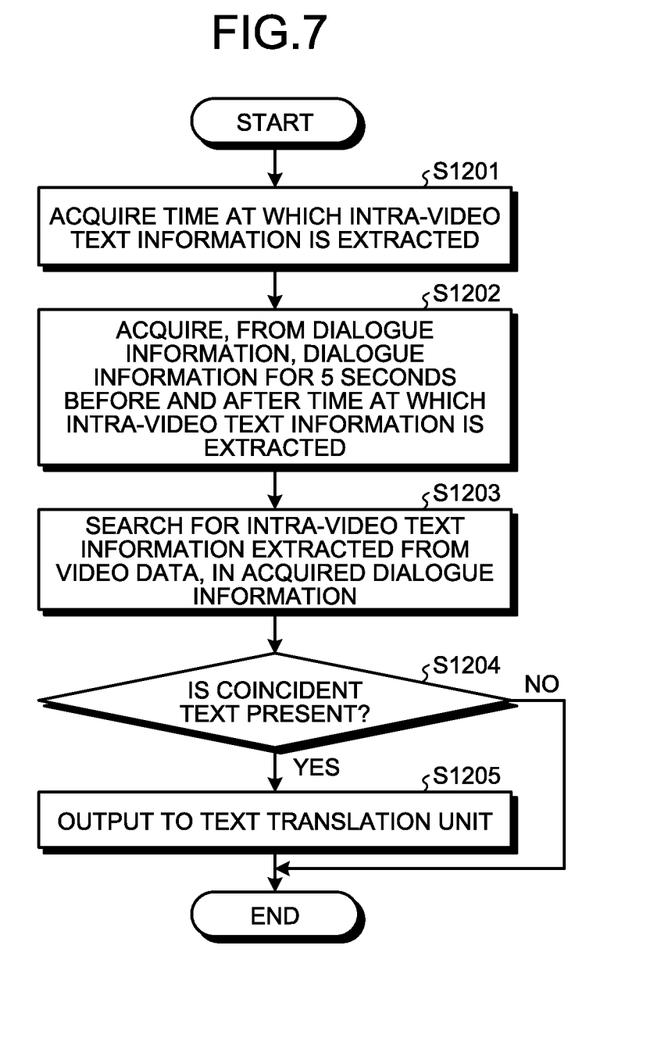
FIG. 7 is a flowchart illustrating an example of a process performed by a text coincidence detection unit of the subtitle generation apparatus according to the first embodiment.
Figure 8:
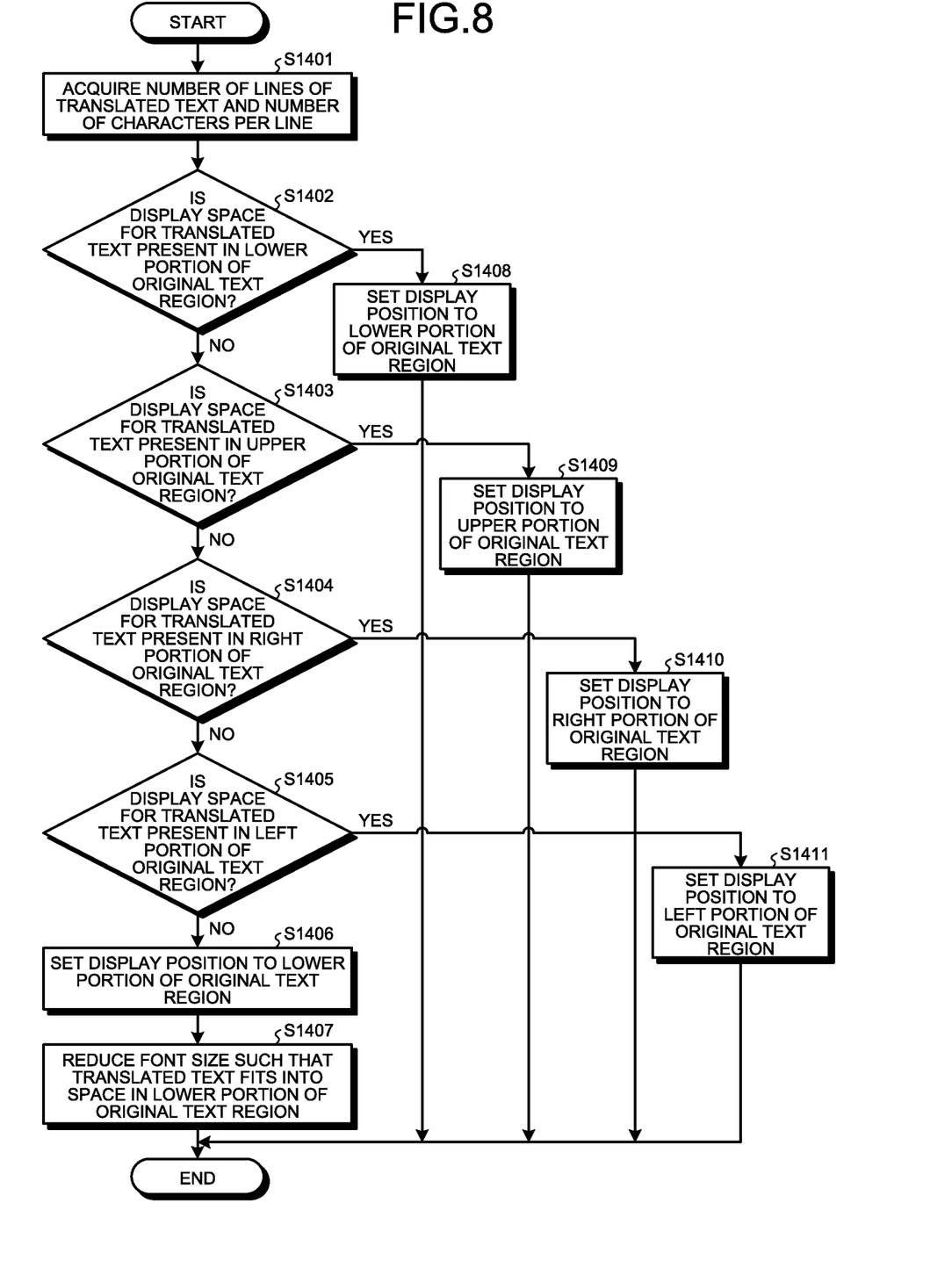
FIG. 8 is a flowchart illustrating an example of a process performed by a display position calculation unit of the subtitle generation apparatus according to the first embodiment.

Next, a method and operation of a process performed by the subtitle generation apparatus 10 will be described with reference to FIG. 6 to FIG. 8. FIG. 6 is a flowchart illustrating an example of a process performed by the subtitle generation apparatus according to the first embodiment. FIG. 7 is a flowchart illustrating an example of a process performed by the text coincidence detection unit of the subtitle generation apparatus according to the first embodiment. FIG. 8 is a flowchart illustrating an example of a process performed by the display position calculation unit of the subtitle generation apparatus according to the first embodiment.

First, with reference to FIG. 6, the process performed by the subtitle generation apparatus 10 will be described. The subtitle generation apparatus 10 causes the text information extraction unit 11 to extract the intra-video text information 120 (Step S11). More specifically, the subtitle generation apparatus 10 causes the text information extraction unit 11 to extract the intra-video text information 120 from the video data 100 of the video including the foreign language text video 100a. Further, the subtitle generation apparatus 10 causes the text information extraction unit 11 to acquire, as the text region information 130, a region in which the intra-video text information 120 is displayed in the video data 100. Furthermore, the subtitle generation apparatus 10 causes the text information extraction unit 11 to acquire the appearance time information indicating a timing at which the foreign language text video 100a is displayed in the video data 100. If the subtitle generation apparatus 10 causes the text information extraction unit 11 to extract all pieces of the intra-video text information 120 in the video data 100, the process proceeds to Step S12.

The subtitle generation apparatus 10 causes the text coincidence detection unit 12 to detect coincident text (Step S12). The process at Step S12 will be described later. If the subtitle generation apparatus 10 detects all pieces of coincident text with respect to the video data 100, the process proceeds to Step S13.

The subtitle generation apparatus 10 causes the text translation unit 13 to translate text (Step S13). More specifically, the subtitle generation apparatus 10 causes the text translation unit 13 to generate the translated text information 150 that is a translation of the coincident text by using a known translation method. If the subtitle generation apparatus 10 translates all pieces of the coincident text information 140, the process proceeds to Step S14.

The subtitle generation apparatus 10 causes the display position calculation unit 18 to calculate a display position (Step S14). The process at Step S14 will be described later. If the subtitle generation apparatus 10 calculates display positions of all pieces of the translated text information 150, the process proceeds to Step S15.

The subtitle generation apparatus 10 causes the subtitle synthesizing unit 19 to synthesize a subtitle (Step S15). More specifically, the subtitle generation apparatus 10 causes the subtitle synthesizing unit 19 to generate the subtitled video data 170 in which the translated text information 150 is added as the subtitle to the foreign language text video 100a of the video data 100, on the basis of the display position information 160 calculated by the display position calculation unit 18. If the subtitle generation apparatus 10 synthesizes all pieces of the translated text information 150 as subtitles to the video data 100, the process is terminated.

Next, the process performed by the text coincidence detection unit 12 at Step S12 will be described with reference to FIG. 7. The text coincidence detection unit 12 acquires a time at which the intra-video text information 120 is extracted (Step S1201). More specifically, the text coincidence detection unit 12 acquires the display time of the appearance time information with respect to the intra-video text information 120 extracted by the text information extraction unit 11. The text coincidence detection unit 12 proceeds to Step S1202.

The text coincidence detection unit 12 acquires, from the dialogue information 110, the dialogue information 110 for 5 seconds before and after the time at which the intra-video text information 120 is extracted (Step S1202). More specifically, the text coincidence detection unit 12 acquires the dialogue information 110 corresponding to the video data 100 for 5 seconds before and after the display time of the appearance time information on the extracted intra-video text information 120. The text coincidence detection unit 12 proceeds to Step S1203.

The text coincidence detection unit 12 searches for the intra-video text information 120 extracted from the video data 100, in the acquired dialogue information 110 (Step S1203). More specifically, the text coincidence detection unit 12 compares the extracted intra-video text information 120 with the acquired dialogue information 110, and detects coincident text. The text coincidence detection unit 12 proceeds to Step S1204.

The text coincidence detection unit 12 determines whether the coincident text is present (Step S1204). More specifically, if the text coincidence detection unit 12 detects the coincident text at Step S1203 (Yes at Step S1204), the process proceeds to Step S1205. If the text coincidence detection unit 12 does not detect the coincident text at Step S1203 (No at Step S1204), the process is terminated without performing processes from Step S13.

The text coincidence detection unit 12 outputs the coincident text information 140 to the text translation unit 13 (Step S1205). Accordingly, the processes from Step S13 are performed.

Next, a method and operation of the process performed by the display position calculation unit 18 at Step S14 will be described with reference to FIG. 8. The display position calculation unit 18 acquires the number of lines of the translated text and the number of characters per line (Step S1401). More specifically, the display position calculation unit 18 acquires the number of lines of the translated text and the number of characters per line from the translated text information 150 and the maximum number of characters per line in a case where the translated text information 150 is displayed as a subtitle. Then, the display position calculation unit 18 calculates a range in a horizontal direction and a vertical direction for displaying the translated text information 150 in the video data 100, on the basis of the font size, the number of lines of the translated text, and the number of characters per line. The display position calculation unit 18 proceeds to Step S1402.

The display position calculation unit 18 determines whether a display space for the translated text is present in a lower portion of an original text region (Step S1402). A case in which the display space is present indicates a case in which the range in the horizontal direction and the vertical direction for displaying the translated text information 150 in the video data 100 is included in a predefined range in the horizontal direction and the vertical direction for displaying the video data 100. Further, a case in which the display space is not present indicates a case in which the range in the horizontal direction and the vertical direction for displaying the translated text information 150 in the video data 100 is not included in but exceeds the predefined range in the horizontal direction and the vertical direction for displaying the video data 100. The range in the horizontal direction and the vertical direction for displaying the translated text information 150 is set by the display position calculation unit 18 through processes from S1402 to S1407 (to be described later), with reference to the text region information 130 that is acquired from the text information extraction unit 11. If the display position calculation unit 18 determines that the display space for the translated text information 150 is present in the lower portion 101 of the text region information 130 (Yes at Step S1402), the process proceeds to Step S1408. If the display position calculation unit 18 determines that the display space of the translated text information 150 is not present in the lower portion 101 of the text region information 130 (No at Step S1402), the process proceeds to Step S1403.

The display position calculation unit 18 determines whether the display space for the translated text information 150 is present in the upper portion of the original text region (Step S1403). If the display position calculation unit 18 determines that the display space for the translated text information 150 is present in the upper portion 102 of the text region information 130 (Yes at Step S1403), the process proceeds to Step S1409. If the display position calculation unit 18 determines that the display space for the translated text information 150 is not present in the upper portion 102 of the text region information 130 (No at Step S1403), the process proceeds to Step S1404.

The display position calculation unit 18 determines whether the display space for the translated text information 150 is present in the right portion of the original text region (Step S1404). If the display position calculation unit 18 determines that the display space for the translated text information 150 is present in the right portion 103 of the text region information 130 (Yes at Step S1404), the process proceeds to Step S1410. If the display position calculation unit 18 determines that the display space for the translated text information 150 is not present in the right portion 103 of the text region information 130 (No at Step S1404), the process proceeds to Step S1405.

The display position calculation unit 18 determines whether the display space for the translated text information 150 is present in the left portion of the original text region (Step S1405). If the display position calculation unit 18 determines that the display space for the translated text information 150 is present in the left portion 104 of the text region information 130 (Yes at Step S1405), the process proceeds to Step S1411. If the display position calculation unit 18 determines that the display space for the translated text information 150 is not present in the left portion 104 of the text region information 130 (No at Step S1405), the process proceeds to Step S1406.

The display position calculation unit 18 sets the display position to the lower portion of the original text region (Step S1406). The display position calculation unit 18 sets the lower portion 101 of the text region information 130 as the display position. The display position calculation unit 18 proceeds to Step S1407.

The display position calculation unit 18 reduces the font size such that the translated text information 150 fits into a space in the lower portion of the original text region (Step S1407). Accordingly, the size of the display space is reduced. The display position calculation unit 18 terminates the process.

The display position calculation unit 18 sets the display position to the lower portion of the original text region (Step S1408). The display position calculation unit 18 sets the lower portion 101 of the text region information 130 as the display position. The display position calculation unit 18 terminates the process.

The display position calculation unit 18 sets the display position to the upper portion of the original text region (Step S1409). The display position calculation unit 18 sets the upper portion 102 of the text region information 130 as the display position. The display position calculation unit 18 terminates the process.

The display position calculation unit 18 sets the display position to the right portion of the original text region (Step S1410). The display position calculation unit 18 sets the right portion 103 of the text region information 130 as the display position. The display position calculation unit 18 terminates the process.

The display position calculation unit 18 sets the display position to the left portion of the original text region (Step S1411). The display position calculation unit 18 sets the left portion 104 of the text region information 130 as the display position. The display position calculation unit 18 terminates the process.

In this manner, if the intra-video text information 120 and the dialogue information 110 coincide with each other, the subtitled video data 170 in which a subtitle that is a translation of the foreign language text video 100a of the video data 100 is synthesized in the video data 100 is generated.

As described above, in the present embodiment, if the intra-video text information 120 and the dialogue information 110 coincide with each other, it is possible to generate the subtitled video data 170 in which the subtitle that is the translation of the foreign language text video 100a of the video data 100 is synthesized in the video data 100. In this manner, in the present embodiment, it is possible to effectively generate the translated subtitle of the foreign language text video 100a of the video data 100.

In the present embodiment, if the intra-video text information 120 and the dialogue information 110 coincide with each other, the foreign language text video 100a of the video data 100 is translated. Therefore, in the present embodiment, it is possible to generate a translated subtitle for only the foreign language text video 100a that is needed for a story or the foreign language text video 100a that is important.

In contrast, if all of the foreign language text videos 100a are translated and displayed as subtitles, the amount of information on the translated subtitles become enormous, so that it may become difficult to concentrate on viewing the video data 100.

According to the present embodiment, a translated subtitle is generated for only the necessary foreign language text video 100a, so that it is possible to prevent the amount of information on subtitles from excessively increasing.

Second Embodiment

Figure 9:
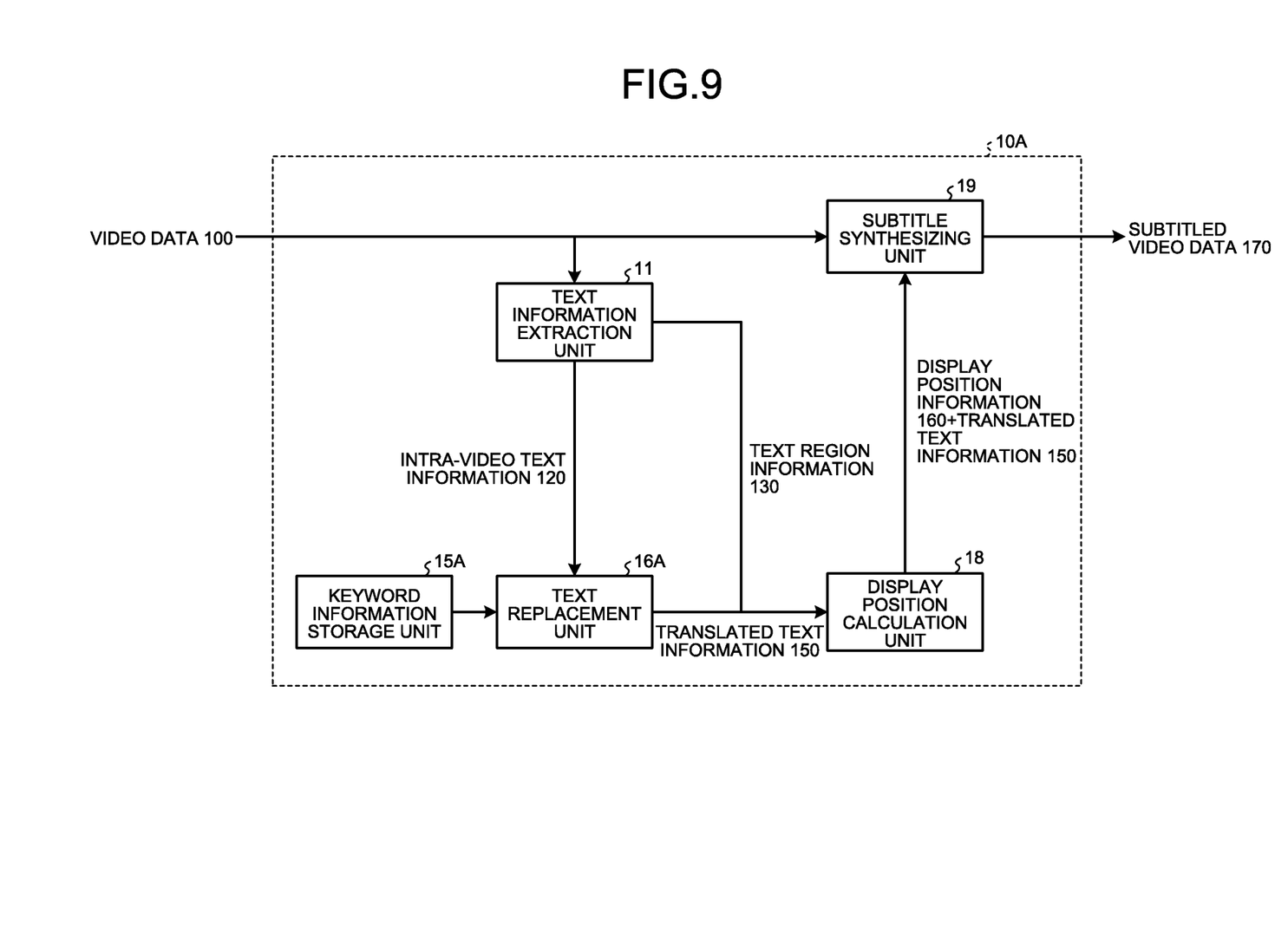
FIG. 9 is a block diagram illustrating a configuration example of a subtitle generation apparatus according to a second embodiment.
Figure 10:
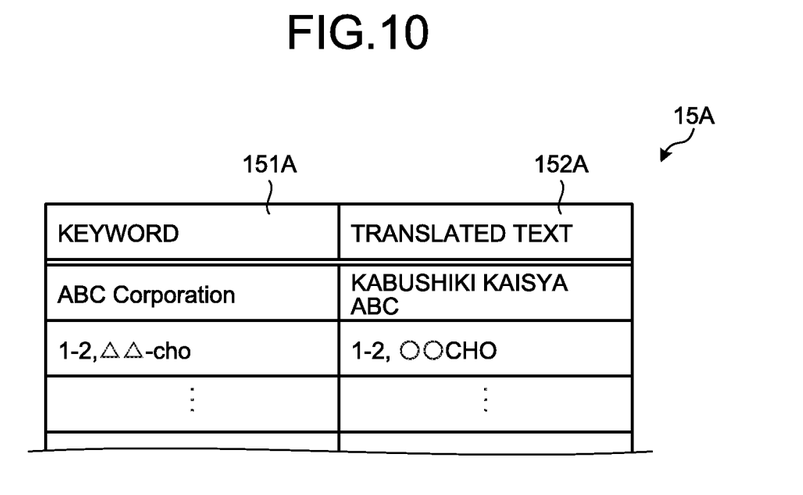
FIG. 10 is a diagram illustrating an example of a keyword information storage unit according to the second embodiment.
Figure 11:
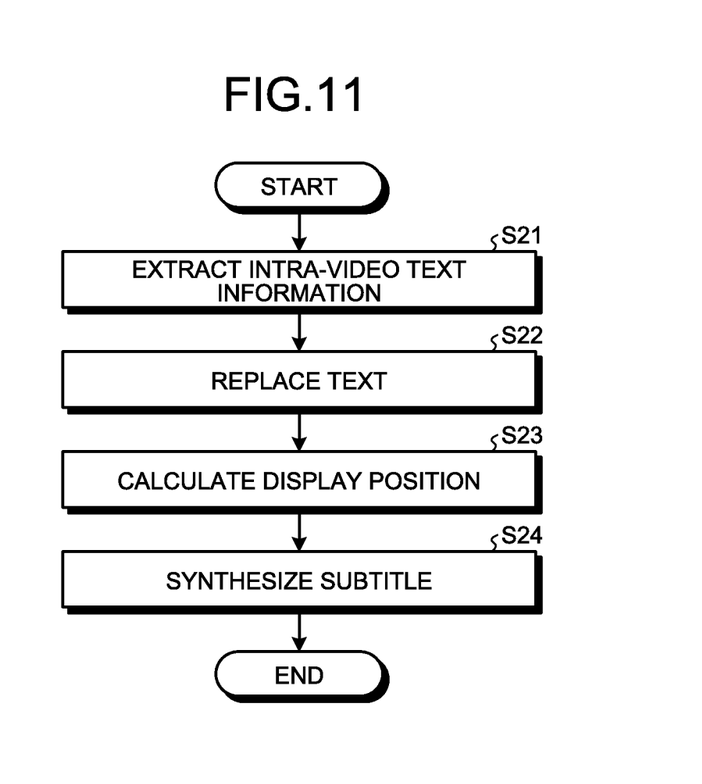
FIG. 11 is a flowchart illustrating an example of a process performed by the subtitle generation apparatus according to the second embodiment.

With reference to FIG. 9 to FIG. 11, a subtitle generation apparatus 10A according to a second embodiment will be described. FIG. 9 is a block diagram illustrating a configuration example of the subtitle generation apparatus according to the second embodiment. FIG. 10 is a diagram illustrating an example of a keyword information storage unit according to the second embodiment. FIG. 11 is a flowchart illustrating an example of a process performed by the subtitle generation apparatus according to the second embodiment. A basic configuration of the subtitle generation apparatus 10A is the same as the configuration of the subtitle generation apparatus 10 of the first embodiment. In the following description, the same structural elements as those of the subtitle generation apparatus 10 are denoted by the same or corresponding reference symbols, and detailed explanation of the structural elements will be omitted. The subtitle generation apparatus 10A according to the present embodiment includes the text information extraction unit 11, the display position calculation unit 18, and the subtitle synthesizing unit 19, which are the same as those of the first embodiment, and further includes a keyword information storage unit 15A and a text replacement unit 16A.

The keyword information storage unit 15A will be described with reference to FIG. 10. The keyword information storage unit 15A stores therein, in advance, a keyword 151A that is needed to be translated and a translated text 152A with respect to the video data 100. The keyword information storage unit 15A stores therein, for each piece of the video data 100, those that are needed for a story, those that are important, and those that need to be translated in the intra-video text information 120 included in the video data 100. If the keyword 151A that coincides with the extracted intra-video text information 120 is present, the keyword 151A is translated by being replaced with the translated text 152A.

The text replacement unit 16A acquires, from the keyword information storage unit 15A, the keyword 151A that coincides with the intra-video text information 120 and the translated text 152A, and translates text of the intra-video text information 120 by replacing the text with the translated text 152A. The text replacement unit 16A outputs the translated text information 150 that has been translated to the display position calculation unit 18.

Next, a method and operation of a process performed by the subtitle generation apparatus 10A will be described with reference to FIG. 11. Processes at Step S21, Step S23, and Step S24 in the flowchart illustrated in FIG. 11 are the same as the processes at Step S11, Step S14, and Step S15 in the flowchart illustrated FIG. 6.

The subtitle generation apparatus 10A causes the text replacement unit 16A to replace text (Step S22). More specifically, the subtitle generation apparatus 10A causes the text replacement unit 16A to acquire, from the keyword information storage unit 15A, the keyword 151A that coincides with the intra-video text information 120 and the translated text 152A. Then, the subtitle generation apparatus 10A causes the text replacement unit 16A to translate the text of the intra-video text information 120 by replacing the text with the translated text 152A. If the subtitle generation apparatus 10 translates all pieces of the intra-video text information 120 that coincide with the keyword 151A, the process proceeds to Step S23.

In this manner, if the intra-video text information 120 and the keyword 151A in the keyword information storage unit 15A coincide with each other, the subtitled video data 170 in which a subtitle as a translation obtained by replacing the foreign language text video 100a in the video data 100 with the keyword 151A is synthesized in the video data 100.

As described above, in the present embodiment, if the intra-video text information 120 and the keyword 151A in the keyword information storage unit 15A coincide with each other, it is possible to generate the subtitled video data 170 in which the subtitle as a translation obtained by replacing the foreign language text video 100a in the video data 100 with the keyword 151A is synthesized in the video data 100. In this manner, in the present embodiment, it is possible to effectively generate a translated subtitle for the foreign language text video 100a of the video data 100.

In the present embodiment, if the intra-video text information 120 and the keyword 151A in the keyword information storage unit 15A coincide with each other, the foreign language text video 100a of the video data 100 is translated. Therefore, in the present embodiment, it is possible to generate translated subtitles only for those that are needed for a story, those that are important, and those that are needed to be translated.

In the present embodiment, the intra-video text information 120 is translated based on the keyword information storage unit 15A. Therefore, when the intra-video text information 120 is repeatedly extracted, it is possible to effectively generate the translated subtitle. Further, when the intra-video text information 120 is repeatedly extracted, it is possible to translate the intra-video text information 120 using the same translated text 152A.

Third Embodiment

Figure 12:
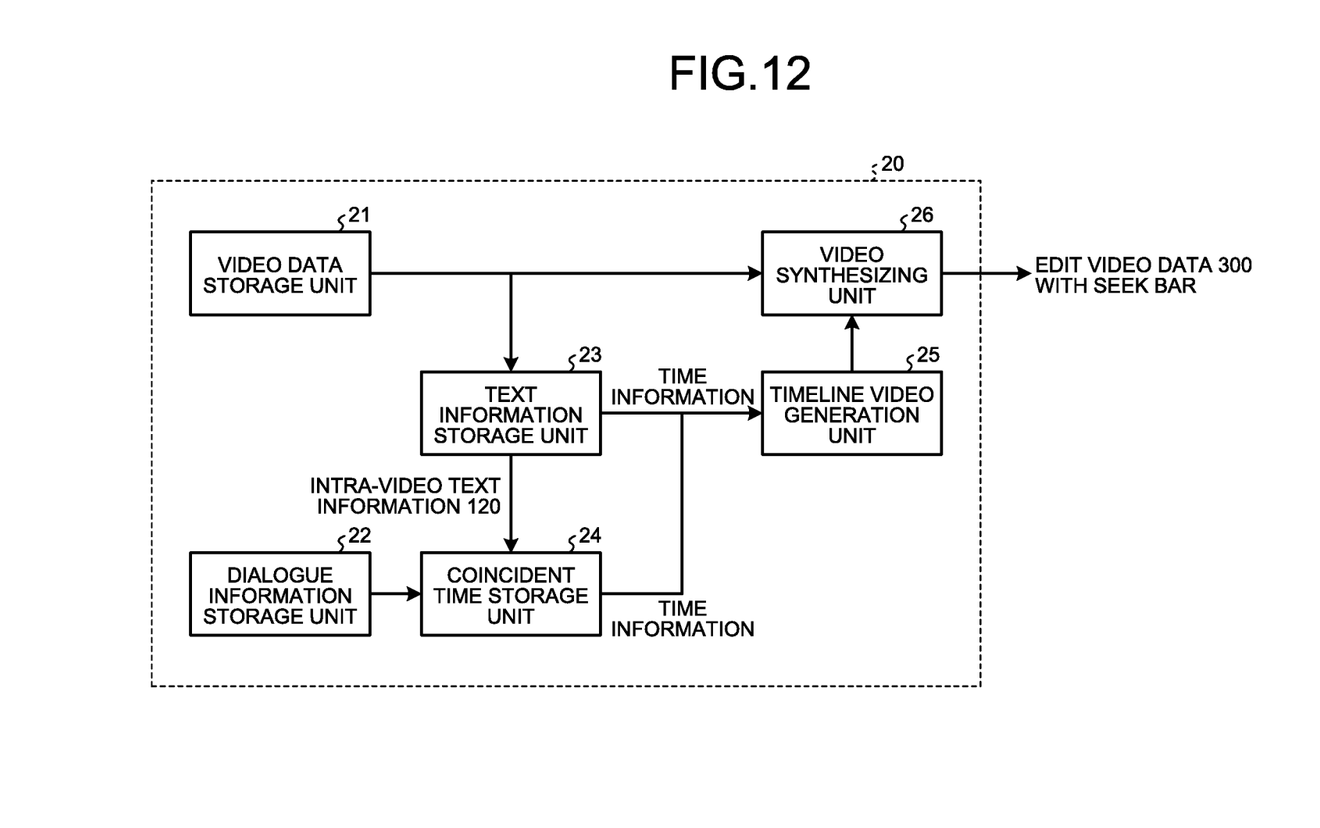
FIG. 12 is a block diagram illustrating a configuration example of a subtitle generation apparatus according to a third embodiment.
Figure 13:
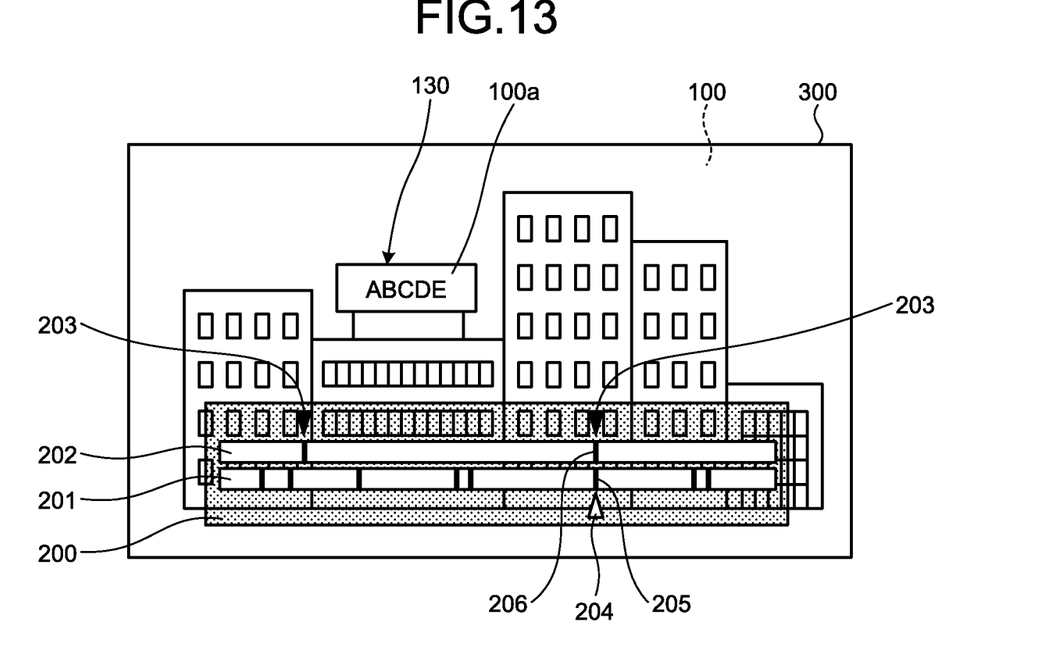
FIG. 13 is a diagram illustrating an example of an edit screen that is displayed.
Figure 14:
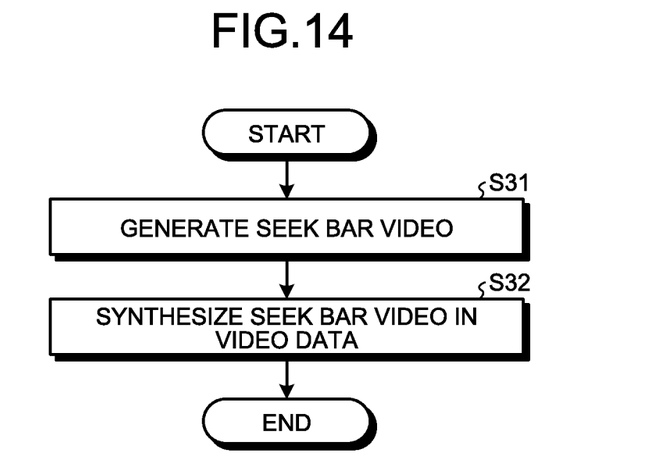
FIG. 14 is a flowchart illustrating an example of a process performed by the subtitle generation apparatus according to the third embodiment.

With reference to FIG. 12 to FIG. 14, a subtitle generation apparatus 20 according to a third embodiment will be described. FIG. 12 is a block diagram illustrating a configuration example of the subtitle generation apparatus according to the third embodiment. FIG. 13 is a diagram illustrating an example of an edit screen that is displayed. FIG. 14 is a flowchart illustrating an example of a process performed by the subtitle generation apparatus according to the third embodiment.

The subtitle generation apparatus 20 generates video data 300 for editing (hereinafter, referred to as "edit video data") in which a seek bar is added, when generating a subtitle for the video data 100 of the video including the foreign language text video 100a. The subtitle generation apparatus 20 includes a video data storage unit 21, a dialogue information storage unit 22, a text information storage unit 23, a coincident time storage unit 24, a timeline video generation unit 25, and a video synthesizing unit 26.

The video data storage unit 21 stores therein the video data 100 of the video that includes the text video 100a of characters in a foreign language.

The dialogue information storage unit 22 stores therein the dialogue information 110 that is data of a dialogue associated with the video data 100.

The text information storage unit 23 stores therein the intra-video text information 120 extracted from the video data 100 and the appearance time information in the video data 100. More specifically, the text information storage unit 23 stores therein, for example, the intra-video text information 120 that is extracted by the text information extraction unit 11 of the first embodiment, the text region information 130, and the appearance time information. The text information storage unit 23 outputs the intra-video text information 120 to the coincident time storage unit 24. The text information storage unit 23 outputs time information on a display time of the appearance time information to the timeline video generation unit 25.

The coincident time storage unit 24 stores therein, as a coincident time, a time at which the intra-video text information 120 stored in the text information storage unit 23 appears among all pieces of the dialogue information 110 stored in the dialogue information storage unit 22. More specifically, the coincident time storage unit 24 stores therein, as the coincident time, the display time of the intra-video text information 120 at the time the text coincidence detection unit 12 of the first embodiment detects the coincident text, for example. The coincident time storage unit 24 outputs time information on the stored coincident time to the timeline video generation unit 25.

The timeline video generation unit 25 generates a seek bar video (timeline video) 200 in which the time information on the appearance time of the intra-video text information 120 stored in the text information storage unit 23 and the time information on the coincident time extracted by the coincident time storage unit 24 are displayed on an entire timeline of the video data 100. The timeline video generation unit 25 generates the seek bar video 200 in which each piece of time information is displayed in a superimposed manner on the entire timeline of the video data 100, on the basis of the time information on the intra-video text information 120 stored in the text information storage unit 23 and the time information indicating presence of the coincident text stored in the coincident time storage unit 24.

The seek bar video 200 will be described with reference to FIG. 13. The seek bar video 200 is a video of the entire timeline of the video data 100. The seek bar video 200 includes a video text information seek bar 201, a dialogue information seek bar 202, coincidence markers 203, a replay position marker 204, a marker 205, and a marker 206. The video text information seek bar 201 is the entire timeline of the video data 100. In the video text information seek bar 201, the marker 205 is displayed at a time at which the intra-video text information 120 is present. The dialogue information seek bar 202 is the entire timeline of the video data 100. In the dialogue information seek bar 202, the marker 206 is displayed at a time at which a dialogue that coincides with the intra-video text information 120 is present. The coincidence markers 203 are displayed when a time at which the dialogue that coincides with the intra-video text information 120 is present is within a predetermined time range with respect to the video data 100. The replay position marker 204 indicates a time at which the video data 100 is replayed.

The video synthesizing unit 26 generates the edit video data 300 that is displayed on an edit screen by synthesizing the seek bar video 200 generated by the timeline video generation unit 25 in the video data 100. The edit video data 300 displays the seek bar video 200 on the video data 100 in a semi-transmissively superimposed manner.

Next, a method and operation of a process performed by the subtitle generation apparatus 20 will be described with reference to FIG. 14. The subtitle generation apparatus 20 causes the timeline video generation unit 25 to generate the seek bar video 200 (Step S31). More specifically, the subtitle generation apparatus 20 causes the timeline video generation unit 25 to generate the seek bar video 200 in which each piece of time information is displayed in a superimposed manner on the entire timeline of the video data 100, on the basis of the time information on a time at which the text in the text information storage unit 23 is present and the time information indicating presence of the text in the coincident time storage unit 24. The subtitle generation apparatus 20 proceeds to Step S32.

The subtitle generation apparatus 20 causes the video synthesizing unit 26 to generate the edit video data 300 by synthesizing the seek bar video 200 in the video data 100 (Step S32). The subtitle generation apparatus 20 terminates the process.

As described above, it is possible to generate the edit video data 300 in which the seek bar video 200 is synthesized, where the seek bar video 200 displays the display time of the intra-video text information 120, the time at which the dialogue that coincides with the intra-video text information 120 is present, and the time at which the coincident text is present. According to the present embodiment, it is possible to easily check whether the subtitle of the foreign language text video 100a is appropriately added while checking the video data 100 and the dialogue information 110 indicated by the coincidence markers 203. In this manner, in the present embodiment, it is possible to effectively generate a translated subtitle for the foreign language text video 100a of the video data 100. In the present embodiment, it is possible to effectively perform editing work.

While the subtitle generation apparatus 10, the subtitle generation apparatus 10A, and the subtitle generation apparatus 20 according to the present disclosure have been described above, the present technology may be embodied in various forms other than the embodiments as described above.

The structural elements of the subtitle generation apparatus 10, the subtitle generation apparatus 10A, and the subtitle generation apparatus 20 illustrated in the drawings are functionally conceptual and need not necessarily be physically configured in the manner illustrated in the drawings. That is, specific forms of the apparatuses are not limited to those illustrated in the drawings, and all or part of the apparatuses may be functionally or physically distributed or integrated in arbitrary units depending on various loads or use conditions of the apparatuses.

The configurations of the subtitle generation apparatus 10, the subtitle generation apparatus 10A, and the subtitle generation apparatus 20 are realized, as software, by a program or the like loaded on a memory, for example. In the present embodiments, it is explained that functional blocks are implemented by cooperation with hardware or software. That is, the functional blocks may be realized in various forms using only hardware, using only software, or using a combination of hardware and software.

According to the present disclosure, it is possible to effectively generate a translated subtitle of a text video in a video.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A subtitle generation apparatus comprising:
a text information extraction unit configured to extract character information from video data of a video that includes characters;
a text coincidence detection unit configured to detect character information included in dialogue information that is data of a dialogue associated with the video data, from the character information extracted by the text information extraction unit;
a text translation unit configured to generate translated text information that is a translation of the character information detected by the text coincidence detection unit;
a display position calculation unit configured to calculate a display position of the translated text information in the video data, on the basis of text region information that indicates a region in which a video corresponding to the character information is displayed in the video data and on the basis of the translated text information; and
a subtitle synthesizing unit configured to add, as a subtitle, the translated text information to the video data on the basis of display position information calculated by the display position calculation unit.

2. The subtitle generation apparatus according to claim 1, wherein the text coincidence detection unit detects, from the character information extracted by the text information extraction unit, character information that is included in the dialogue information within a predetermined range with reference to a time at which characters included in the video appear.

3. A subtitle generation apparatus comprising:
a video data storage unit configured to store therein video data of a video including characters;
a dialogue information storage unit configured to store therein dialogue information that is data of a dialogue associated with the video data;
a text information storage unit configured to store therein character information extracted from the video and appearance time information indicating a time at which the character information extracted from the video appears;
a coincident time storage unit configured to store therein coincident time information indicating a time at which the character information stored in the text information storage unit appears in the dialogue information stored in the dialogue information storage unit;
a timeline video generation unit configured to generate a timeline video in which the appearance time information on the character information stored in the text information storage unit and the coincident time information stored in the coincident time storage unit are displayed on an entire timeline of the video data; and
a video synthesizing unit configured to synthesize the timeline video generated by the timeline video generation unit in the video data.

4. A subtitle generation method comprising:
extracting character information from video data of a video that includes characters;
detecting character information included in dialogue information that is data of a dialogue associated with the video data, from the character information extracted at the extracting;
generating translated text information that is a translation of the character information detected at the detecting;
calculating a display position of the translated text information in the vide data, on the basis of text region information that indicates a region in which a video corresponding to the character information is displayed in the video data and on the basis of the translated text information; and
adding, as a subtitle, the translated text information to the video data on the basis of display position information calculated at the calculating.

* * * * *